(12) United States Patent
Schauer et al.

(10) Patent No.: US 7,047,335 B2
(45) Date of Patent: May 16, 2006

(54) METHOD FOR RECEIVING USER DEFINED FRAME INFORMATION STRUCTURE (FIS) TYPES IN A SERIAL-ATA (SATA) SYSTEM

(75) Inventors: Steven A. Schauer, Loveland, CO (US); Christopher D. Paulson, Fort Collins, CO (US); Timothy D. Thompson, Windsor, CO (US)

(73) Assignee: LSI Logic Corporation, Milpitas, CA (US)

( * ) Notice: Subject to any disclaimer, the term of this patent is extended or adjusted under 35 U.S.C. 154(b) by 376 days.

(21) Appl. No.: 10/205,063

(22) Filed: Jul. 25, 2002

(65) Prior Publication Data

US 2004/0019718 A1    Jan. 29, 2004

(51) Int. Cl.
*G06F 13/42* (2006.01)
*G06F 13/00* (2006.01)

(52) U.S. Cl. ...................... 710/105; 710/111
(58) Field of Classification Search ............... 710/30, 710/105, 74, 111
See application file for complete search history.

(56) References Cited

U.S. PATENT DOCUMENTS

| 4,866,601 | A  | * | 9/1989  | DuLac et al. ............... 711/111 |
| 5,111,423 | A  | * | 5/1992  | Kopec et al. .................. 710/9 |
| 5,727,005 | A  | * | 3/1998  | Le et al. ..................... 714/814 |
| 5,918,068 | A  | * | 6/1999  | Shafe' ......................... 710/11 |
| 5,996,027 | A  | * | 11/1999 | Volk et al. .................... 710/13 |
| 6,282,501 | B1 | * | 8/2001  | Assouad ...................... 702/117 |
| 6,496,900 | B1 | * | 12/2002 | McDonald et al. ......... 711/112 |
| 6,601,119 | B1 | * | 7/2003  | Slutz et al. ................ 710/104 |
| 6,639,885 | B1 | * | 10/2003 | Yada et al. .............. 369/53.45 |
| 6,895,500 | B1 | * | 5/2005  | Rothberg ....................... 713/1 |
| 2002/0156954 | A1 | * | 10/2002 | Edwards ..................... 710/105 |

* cited by examiner

*Primary Examiner*—Rehana Perveen
*Assistant Examiner*—Christopher Daley
(74) *Attorney, Agent, or Firm*—Christopher P. Maiorana, P.C.

(57) ABSTRACT

An apparatus comprising one or more user programmable registers and a circuit configured to compare a predetermined portion of one or more information packets with contents of said one or more user programmable registers.

21 Claims, 2 Drawing Sheets

METHOD FOR RECEIVING USER DEFINED FRAME INFORMATION STRUCTURE (FIS) TYPES IN A SERIAL-ATA (SATA) SYSTEM

FIELD OF THE INVENTION

The present invention relates to packet transfer protocols generally and, more particularly, to a method for receiving user defined frame information structure (FIS) types in Serial-ATA (SATA) systems.

BACKGROUND OF THE INVENTION

Referring to FIG. 1, a block diagram of a serial-ATA frame 10 is shown. The serial advanced technology attachment (Serial-ATA or SATA) specification revision 1.0 (published Aug. 29, 2001), which is hereby incorporated by reference in its entirety, defines a serial communication protocol for communicating with storage devices. In Serial-ATA, information packets are sent using one or more frames 10. The frame 10 includes a start of frame (SOF) delimiter 12, a payload 14, a CRC delimiter 16 and an end of frame (EOF) delimiter 18. The payload 14 contains information organized according to a predefined file information structure (FIS). The FIS of the payload 14 includes a byte 20 that contains a value representing a type parameter of the FIS.

The Serial-ATA specification defines 14 FIS types. The defined FIS types may be summarized as in the following TABLE 1.

TABLE 1

| FIS Type Field (hex) | Definition |
| --- | --- |
| 27h | Register - Host to Device FIS |
| 34h | Register - Device to Host FIS |
| 39h | DMA Activate FIS |
| 41h | DMA Setup FIS |
| 46h | Data FIS |
| 58h | BIST Activate FIS |
| 5Fh | PIO Setup FIS |
| A1h | Set Device Bits FIS |
| A6h | Undefined |
| B8h | Undefined |
| BFh | Undefined |
| C7h | Undefined |
| D4h | Undefined |
| D9h | Undefined |

Since there are only 14 defined types and only six of the types are not currently used, the amount of future expansion is limited.

SUMMARY OF THE INVENTION

The present invention concerns an apparatus comprising one or more user programmable registers and a circuit configured to compare a predetermined portion of an information packet with contents of the one or more user programmable registers.

The objects, features and advantages of the present invention include providing a method for receiving user defined frame information structure (FIS) types in Serial-ATA (SATA) systems that may (i) allow implementation of special functions not yet defined, (ii) allow implementation of functions outside of the Serial-ATA specification, (iii) allow flexibility to define a large number of codes for user defined frame information structures and/or (iv) allow firmware or software update of user defined frame information structures.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
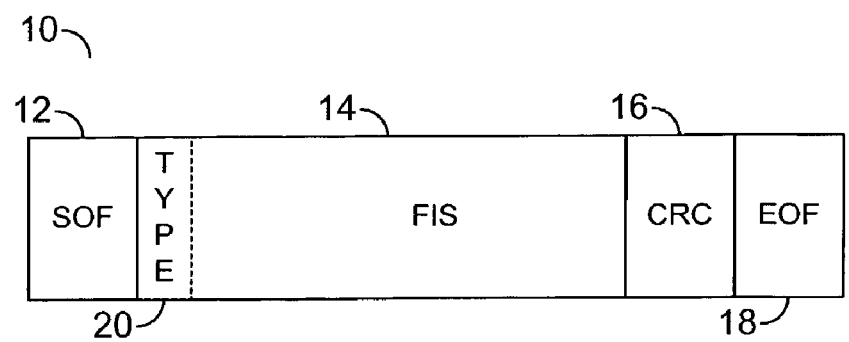
FIG. 1 is a block diagram of a Serial-ATA frame.
Figure 2:
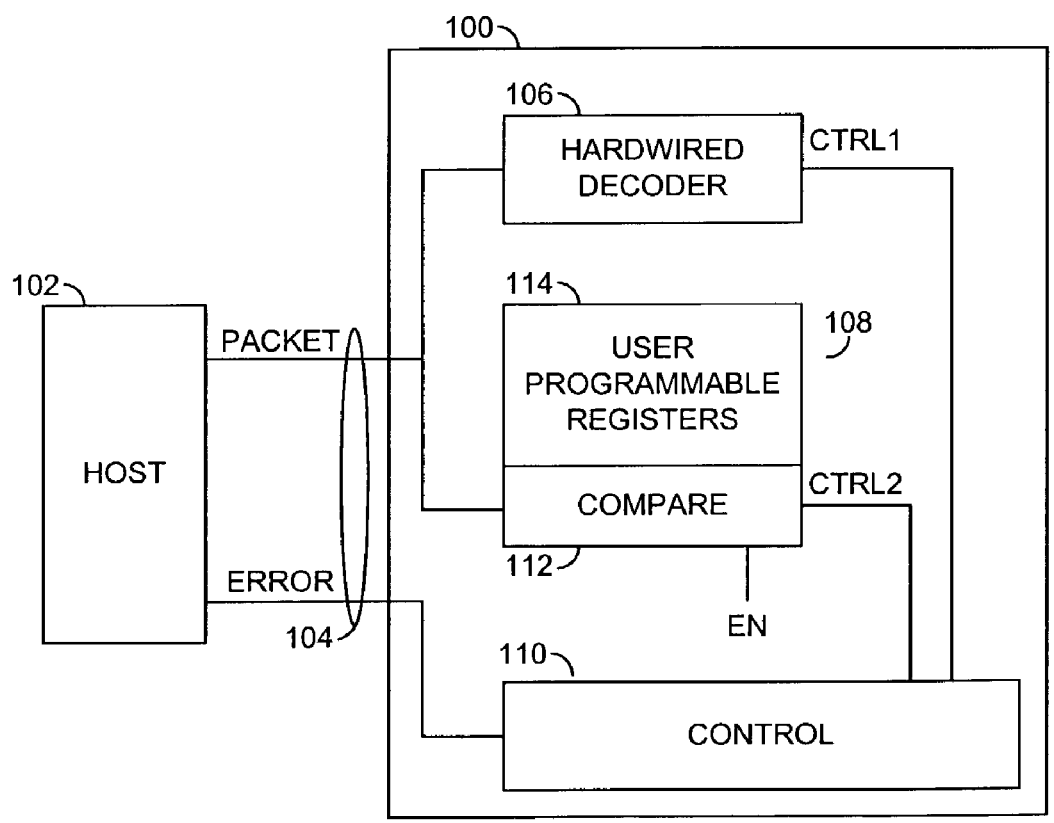
FIG. 2 is a block diagram of a preferred embodiment of the present invention.

Referring to FIG. 2, a block diagram of a circuit 100 is shown in accordance with a preferred embodiment of the present invention. The circuit 100 may be implemented, in one example, as a Serial-ATA device. However, other devices and/or protocols that provide a payload field representative of the payload structure may be implemented accordingly to meet the design criteria of a particular application. In one example, the circuit 100 may be implemented as part of a storage area network. The circuit 100 may be implemented as part of an interface circuit. The circuit 100 may communicate with a host 102 via a bus 104. In one example, the bus 104 may be implemented as a Serial-ATA bus. The circuit 100 may receive a signal (e.g., PACKET) from the host. The signal PACKET may comprise one or more Serial-ATA frames as described in connection with FIG. 1.

The circuit 100 may be configured to determine a file information structure (FIS) type contained within the signal PACKET. When the file information structure type contained within the signal PACKET is of a type recognized by the circuit 100, the payload is generally processed according to the FIS type. When the file information structure contained within the signal PACKET is of a type unknown to (or unrecognized by) the circuit 100, the circuit 100 may be configured to send an error signal (e.g., ERROR) to the host 102. In one example, the signal ERROR may be communicated to the host 102 via a back channel of the bus 104.

The circuit 100 may comprise a circuit 106, a circuit 108, and a circuit 110. The circuit 106 may be implemented, in one example, as a hardwired decoder. The circuit 106 may be configured, in one example, to detect FIS types defined in the Serial-ATA specification, which is hereby incorporated by reference in its entirety. However, hardwired decoders for other protocols may be implemented accordingly to meet the design criteria of a, particular application.

The circuit 100 may be configured to extract a type field (or byte) from the signal PACKET and present the contents of the type field to the circuit 106. The circuit 106 may be configured to compare the type field of the signal PACKET with the predefined FIS types. The circuit 106 may be configured to generate an output signal (e.g., CTRL1) that may have a first state to indicate that the type of the FIS contained within the signal PACKET is recognized as one of the defined FIS types from, for example, the Serial-ATA specification. The signal CTRL1 may have a second state to indicate that the contents of the type field are not recognized.

The contents of the type field from the signal PACKET may also be presented to an input of the circuit 108. The circuit 108 may be configured to compare the type field of the signal PACKET with one or more user defined values.

The circuit 108 may be configured to generate an output signal (e.g., CTRL2) having a first state that may indicate that the contents of the type field matches one of the user defined values. The signal CTRL2 may have a second state to indicate that the contents of the type field are not recognized.

The signals CTRL1 and CTRL2 may be presented to the circuit 110. The circuit 110 may be configured to generate the signal ERROR in response to the signals CTRL1 and CTRL2 indicating that the FIS type of the signal PACKET is unknown. In one example, the signal ERROR may be presented to the host 102 via a back channel of the bus 104.

The circuit 108 may be implemented, in one example, as a comparator circuit 112 and a number of user programmable registers 114. The user programmable registers may be programmed in response to firmware, software and/or any other appropriate method of programming. In one example, the user programmable registers 114 may be programmed during a start up operation of the circuit 100. The user programmable registers 114 may also be programmed on-the-fly in order to vary the recognized user defined FIS types of the circuit 100.

Figures 3, 4:
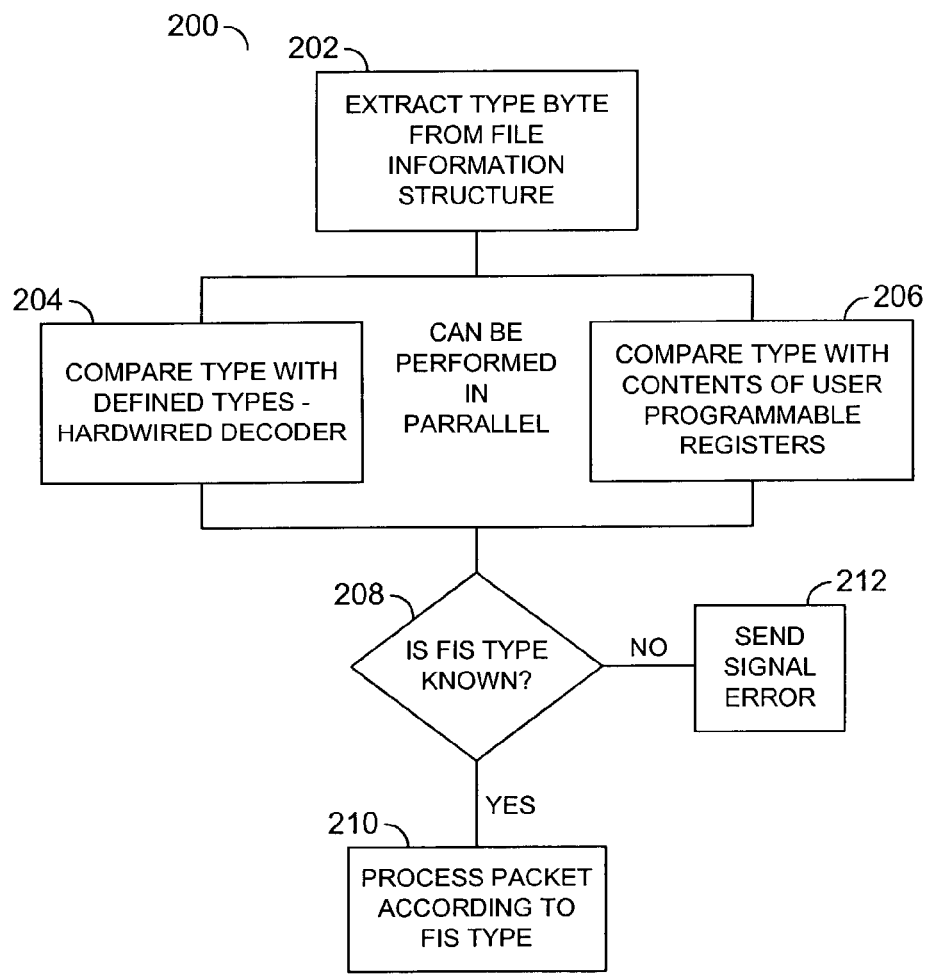
FIG. 3 is a more detailed block diagram of a register of FIG. 2.
FIG. 4 is a flow diagram illustrating an example operation in accordance with the present invention.

Referring to FIG. 3, a block diagram of an example user programmable register 114 of FIG. 2 is shown. In one example, the register 114 may be implemented as a 16-bit firmware programmable register. However, other sizes and other numbers of registers may be implemented accordingly to meet the design criteria of a particular application. In one example, the register 114 may allow a user to define two or more FIS types that may be accepted by the circuit 100. Additional user defined FIS types may be supported with the implementation of additional definition registers and/or minor modifications to the circuit 108 that checks for valid FIS types.

In one example, an enable signal (e.g., EN) may be implemented to control the checking of the FIS type against the user defined FIS type registers. When the user defined FIS type function is not used, the registers 114 may be applied to other purposes. In one example, a first user defined FIS type (e.g., USERDEF_1) may be stored in bits 0 to 7 of the user programmable register 114 and a second user defined FIS type (e.g., USERDEF_2) may be stored in bits 8 to 15 of the user programmable register 114.

Referring to FIG. 4, a flow diagram 200 illustrating an example operation in accordance with a preferred embodiment of the present invention is shown. Upon receiving the signal PACKET, the present invention may extract a type byte (or field) from a file information structure (FIS) contained within the signal PACKET (e.g., the block 202). The type byte may be compared with predefined FIS types via a hardwired decoder configured to recognize the known FIS types as defined, for example, in the Serial-ATA specification (e.g., the block 204).

The extracted type byte also may be compared with one or more user programmable registers to determine whether the FIS type contained within the signal PACKET is of a type not yet defined or which will not be defined by the particular protocol of the interface (e.g., the Serial-ATA specification) but which the circuit 100 is configured to support (e.g., the block 206). The comparison of the type byte via the hardwired decoder and via the firmware programmable registers may be performed simultaneously.

Upon completion of the comparison of the type byte in the hardwired decoder and with the firmware programmable registers, a check is generally made to determine whether the FIS type is recognized (or supported) by the circuit 100 (e.g., the block 208). When the type of the FIS contained within the signal PACKET is recognized by the circuit 100 (e.g., the YES path from the block 208), the circuit 100 is generally configured to process the packet according to the particular FIS type (e.g., the block 210). When the FIS type of the signal PACKET is not recognized (e.g., the NO path from the block 208), the circuit 100 may be configured to send the signal ERROR to the host (e.g., the block 212).

By adding the capability to support user defined FIS types, future enhancements to, for example, the Serial-ATA protocol may be supported without a change in the hardware. Additional user defined FIS types may be supported with additional definition registers and/or minor changes to the hardware that checks the FIS type to ensure the FIS type is valid. An enable may be provided to allow the FIS type to be checked against user defined FIS types. When the function is not needed, the firmware may be configured to leave the registers unprogrammed. The present invention generally allows users to implement special functions not yet defined or which will not be defined by a protocol (e.g., the Serial-ATA specification). The present invention also allows flexibility to define a large number of codes that may be used for user defined payload or file information structures.

The function performed by the flow diagram 200 of FIG. 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

As used herein, the term "simultaneously" is meant to describe events that share some common time period but the term is not meant to be limited to events that begin at the same point in time, end at the same point in time, or have the same duration.

The states of the various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
an interface circuit configured to receive one or more information packets from a host and extract a predetermined portion of said information packets, wherein said predetermined portion is representative of a payload structure of said information packets;
a hardwired decoder circuit configured to generate a first control signal in response to detecting one or more predefined values in said predetermined portion of said one or more information packets;
one or more user programmable registers configured to store one or more user defined values representative of one or more payload structures accepted by said apparatus; and
a compare circuit configured to generate a second control signal in response to a comparison of said predetermined portion of said one or more information packets with contents of said one or more user programmable registers.

2. The apparatus according to claim 1, wherein said contents of said one or more user programmable registers represent one or more predefined structures for said information packets.

3. The apparatus according to claim 1, wherein said user programmable registers are firmware programmable.

4. The apparatus according to claim 1, wherein said user programmable registers are software programmable.

5. The apparatus according to claim 1, wherein said user programmable registers are programmed at power up.

6. The apparatus according to claim 1, wherein said user programmable registers are programmable on-the-fly.

7. The apparatus according to claim 1, further comprising:
a control circuit configured to generate an error signal in response to said predetermined portion of said one or more information packets (i) not matching said contents of said user programmable registers and (ii) not containing said one or more predefined values.

8. The apparatus according to claim 1, wherein said apparatus comprises a storage device.

9. The apparatus according to claim 8, wherein said apparatus is part of a storage area network (SAN).

10. An apparatus comprising:
means for receive one or more information packets from a host, wherein a predetermined portion of said one or more information packets is representative of a payload structure of said information packets;
means for generating a first control signal in response to detecting one or more predefined values in said predetermined portion of one or more information packets;
means for storing one or more user defined values representative of one or more payload structures accepted by said apparatus;
means for generating a second control signal in response to a comparison of said predetermined portion of said one or more information packets with said one or more user defined values; and
means for generating an error signal in response to said first control signal and said second control signal.

11. A method for expanding a number of recognizable information packet types comprising the steps of:
receiving one or more information packets from a host and extracting a predetermined portion, wherein said predetermined portion of said one or more information packets is representative of a payload structure of said information packets;
presenting said predetermined portion of said one or more information packets to a hardwired decoder configured to recognize one or more predefined values;
generating a first control signal in response to said hardwired decoder detecting any of said one or more predefined values in said predetermined portion of said one or more information packets;
providing one or more user programmable registers configured to store one or more user defined values representative of one or more acceptable payload structures; and
generating a second control signal in response to a comparison of said predetermined portion of said one or more information packets with contents of said one or more user programmable registers.

12. The method according to claim 11, wherein said contents of said one or more user programmable registers represent one or more predefined structures for said information packets.

13. The method according to claim 11, further comprising the step of:
providing firmware configured to program said user programmable registers.

14. The method according to claim 13, further comprising the step of:
configuring said firmware to program said user programmable registers at power up.

15. The method according to claim 11, further comprising the step of:
configuring said user programmable registers for programming on-the-fly.

16. The method according to claim 11, further comprising the steps of:
providing said hardwired decoder configured to recognize one or more predefined information packet types; and
generating an error signal in response to (i) a result of said comparison of said predetermined portion of said one or more information packets with said contents of said user programmable registers and (ii) an output of said hardwired decoder.

17. The apparatus according to claim 1, wherein:
said hardwired decoder is configured to recognize one or more predefined information packet types.

18. The apparatus according to claim 1, wherein said one or more information packets comprise serial advanced technology attachment (SATA) information packets and said predetermined portion comprises a type field of a file information structure (FIS).

19. The method according to claim 11, further comprising the step of:
generating an error signal when (i) said one or more predefined values are not detected in said predetermined portion of said one or more information packets and (ii) said contents of said one or more user programmable registers do not match said predetermined portion of said one or more information packets.

20. The method according to claim 11, wherein (i) detecting said one or more predefined values and (ii) comparing said predetermined portion of said one or more information packets with said contents of said one or more user programmable registers are performed simultaneously.

21. The method according to claim 11, further comprising the step of:
controlling said comparison of said predetermined portion of said one or more information packets with said contents of said one or more user programmable registers in response to an enable signal.

* * * * *